United States Patent [19]
Motoyama

[11] Patent Number: 5,829,045
[45] Date of Patent: Oct. 27, 1998

[54] APPARATUS FOR RESTORING/COPYING THE CONTENTS RECORDED IN A STORAGE MEDIUM TO AN AUXILIARY STORAGE INCLUDING PARTITIONS HAVING INDEPENDENT FILE STRUCTURES

[75] Inventor: Minoru Motoyama, Kawasaki, Japan

[73] Assignee: Fujitsu Limited, Tokyo, Japan

[21] Appl. No.: 527,198

[22] Filed: Sep. 12, 1995

[30] Foreign Application Priority Data

Oct. 28, 1994 [JP] Japan .................................. 6-265699

[51] Int. Cl.⁶ .................................................. G06F 12/16
[52] U.S. Cl. ........................ 711/162; 711/173; 711/170; 711/112; 395/182.05
[58] Field of Search .............................. 395/182.04, 489, 395/600, 700, 182.09, 182.13, 182.14, 182.05; 711/173, 170, 112, 165, 162

[56] References Cited

U.S. PATENT DOCUMENTS

| | | | |
|---|---|---|---|
| 4,586,027 | 4/1986 | Tsukiyama et al. | 341/95 |
| 5,089,958 | 2/1992 | Horton et al. | 395/182.03 |
| 5,129,088 | 7/1992 | Auslander et al. | 711/1 |

(List continued on next page.)

FOREIGN PATENT DOCUMENTS

| | | |
|---|---|---|
| 62-185280 | 8/1987 | Japan . |
| 63-108580 | 5/1988 | Japan . |
| 1-237902 | 9/1989 | Japan . |
| 1-260565 | 10/1989 | Japan . |
| 1-276250 | 11/1989 | Japan . |
| 2-39225 | 2/1990 | Japan . |
| 2-118823 | 5/1990 | Japan . |
| 2-250165 | 10/1990 | Japan . |
| 2-311925 | 12/1990 | Japan . |
| 3-78042 | 4/1991 | Japan . |
| 4-260143 | 9/1992 | Japan . |
| 5-12341 | 1/1993 | Japan . |
| 5-216731 | 8/1993 | Japan . |
| 4-365175 | 12/1997 | Japan . |

OTHER PUBLICATIONS

Arno Schaefer, Welcome to FIPS, The First Nondestructive Interactive Partition Splitting Program, version 1.1.1.1., Dec. 13, 1994.
John Lagonikas, Partition Resizer.v. 1.1.1, Program's Manual and Technical Information, ©Zeleps 1994–95.
Sukeyoshi Nakajima, JP 3–7804(A), dated Apr. 3, 1991, Abstract Only.
Shigeki Taniguchi, JP 2–250265(A), dated Oct. 5, 1990, Abstract Only.
Sukeyuki Mochizuki, JP 2–39225, dated Feb. 8, 1990, Abstract Only.
Susumu Matsumura, JP 4 365175(A), dated Dec. 17, 1997, Abstract Only.

(List continued on next page.)

*Primary Examiner*—Eddie P. Chan
*Assistant Examiner*—Hong C. Kim
*Attorney, Agent, or Firm*—Staas & Halsey

[57] ABSTRACT

An apparatus for restoring/copying recorded contents includes a first auxiliary storage (for example, a hard disk) including partitions each having an independent file structure. One particular partition recording partition data concerns the storage position of data in the partitions. A second auxiliary storage (for example, a CD-ROM) includes one partition data file corresponding to the particular partition in the hard disk for holding the partition data, and partition files corresponding to the partitions in the hard disk for holding the contents of the partitions. A partition data restoring unit reads the partition data file from the CD-ROM and records the partition data into the particular partition in the hard disk in response to an input command for restoration from the CD-ROM to the hard disk. A partition restoring unit receives the partition data from the partition data restoring unit, reading sequentially the partition files from the CD-ROM in accordance with the input command, and recording contents of the partition files into corresponding storage positions in the partitions in the hard disk.

2 Claims, 15 Drawing Sheets

U.S. PATENT DOCUMENTS

| | | | |
|---|---|---|---|
| 5,237,460 | 8/1993 | Miller et al. | 360/8 |
| 5,276,860 | 1/1994 | Fortier et al. | 395/182.04 |
| 5,367,682 | 11/1994 | Chang | 395/651 |
| 5,394,534 | 2/1995 | Kulakowski et al. | 711/112 |
| 5,435,004 | 7/1995 | Cox et al. | 707/205 |
| 5,465,350 | 11/1995 | Fueki | 707/204 |
| 5,469,573 | 11/1995 | McGill, III et al. | 395/712 |
| 5,519,869 | 5/1996 | Payne et al. | 395/652 |
| 5,535,381 | 7/1996 | Kopper | 395/872 |
| 5,537,540 | 7/1996 | Miller et al. | 395/183.14 |
| 5,623,669 | 4/1997 | Kincaid | 707/205 |
| 5,675,769 | 10/1997 | Ruff et al. | 711/173 |

OTHER PUBLICATIONS

Atsushi Hatakeyama, JP 1–276250(A), dated Nov. 6, 1989, Abstract Only.

Akihiko Tao, JP 5–12341(A), dated Jan. 22, 1993, Abstract Only.

Makoto Matsui(1), JP 2–311925(A), dated Dec. 27, 1990, Abstract Only.

Hideki Nasu, JP 2–118823, dated May 7, 1990, Abstract Only.

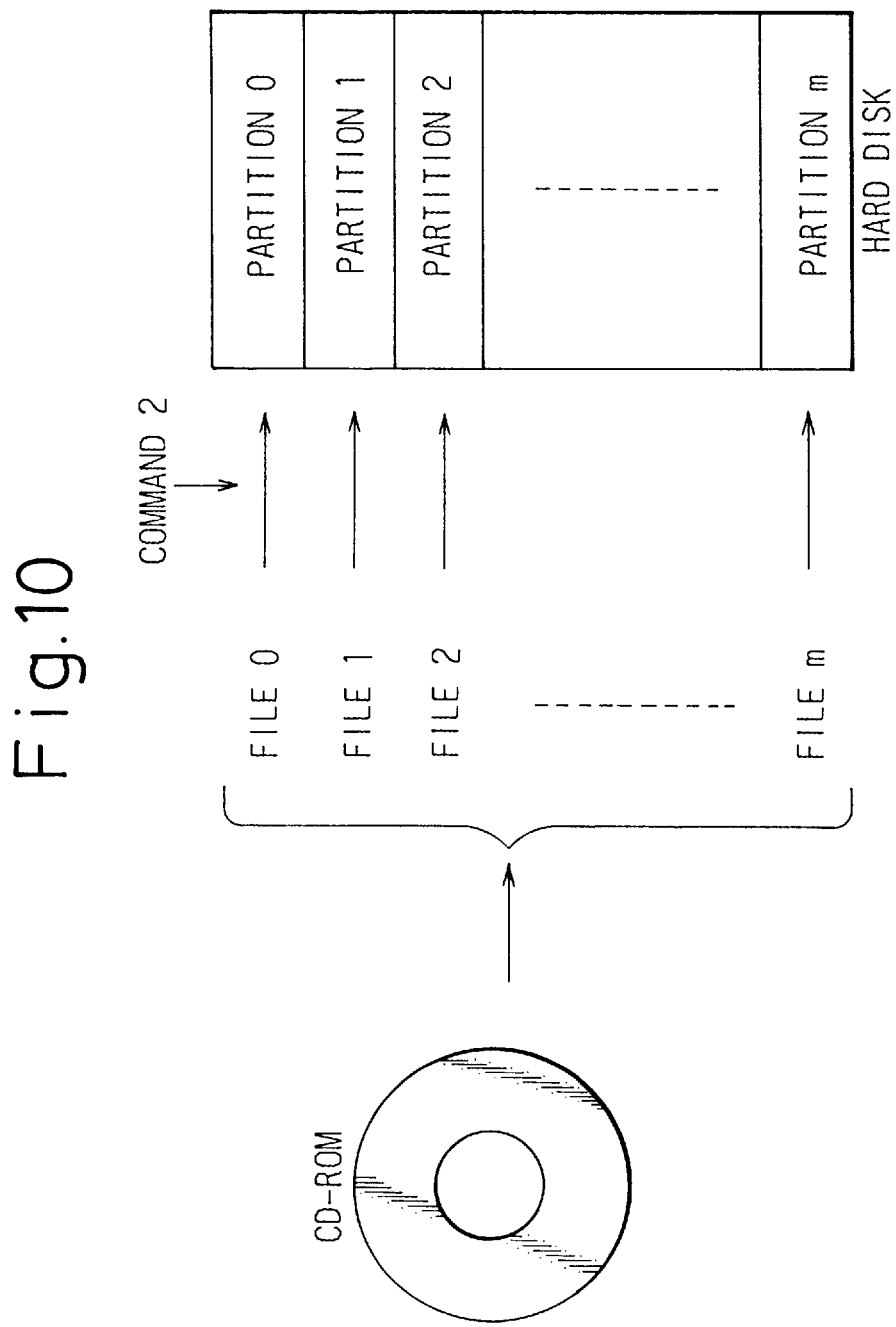

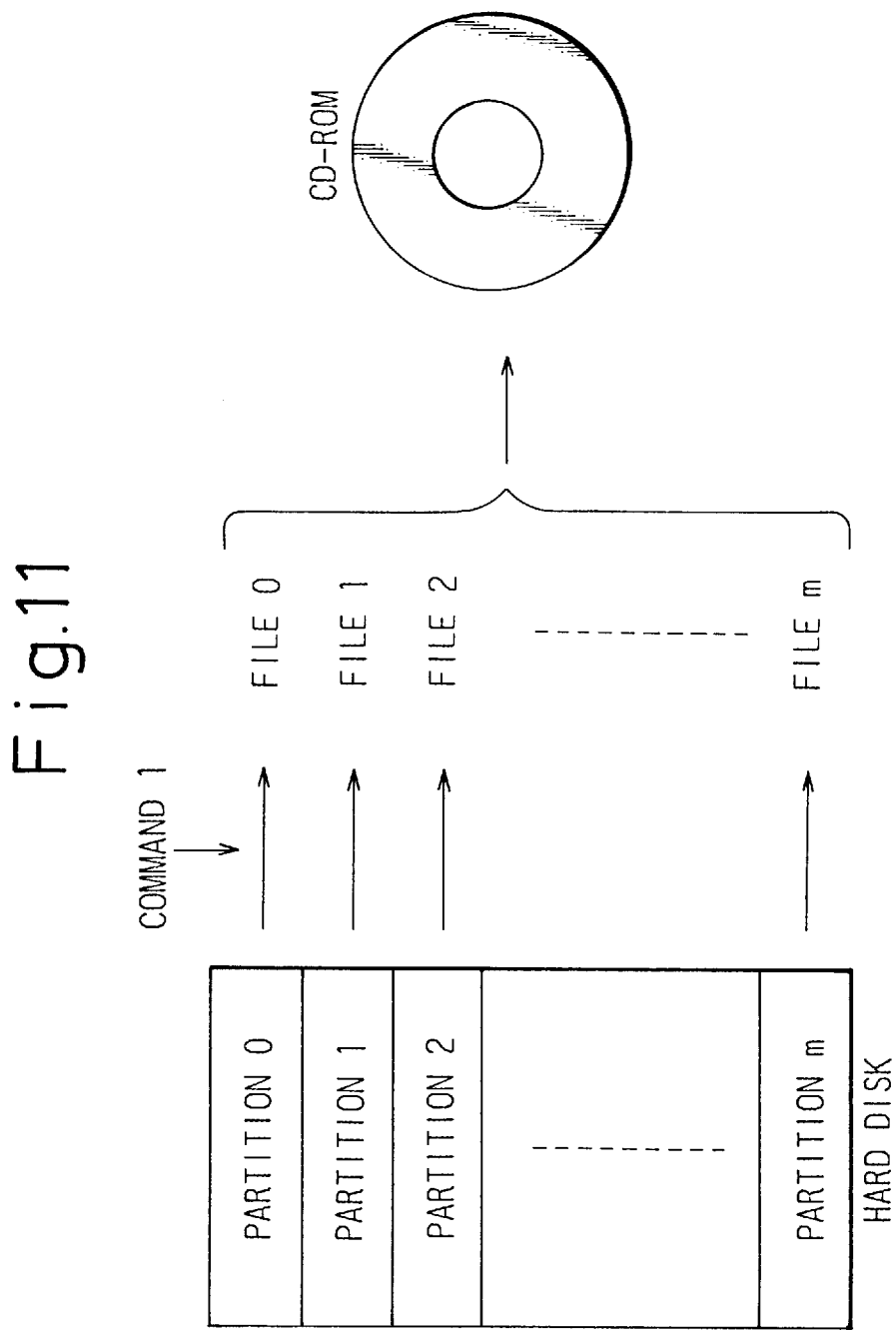

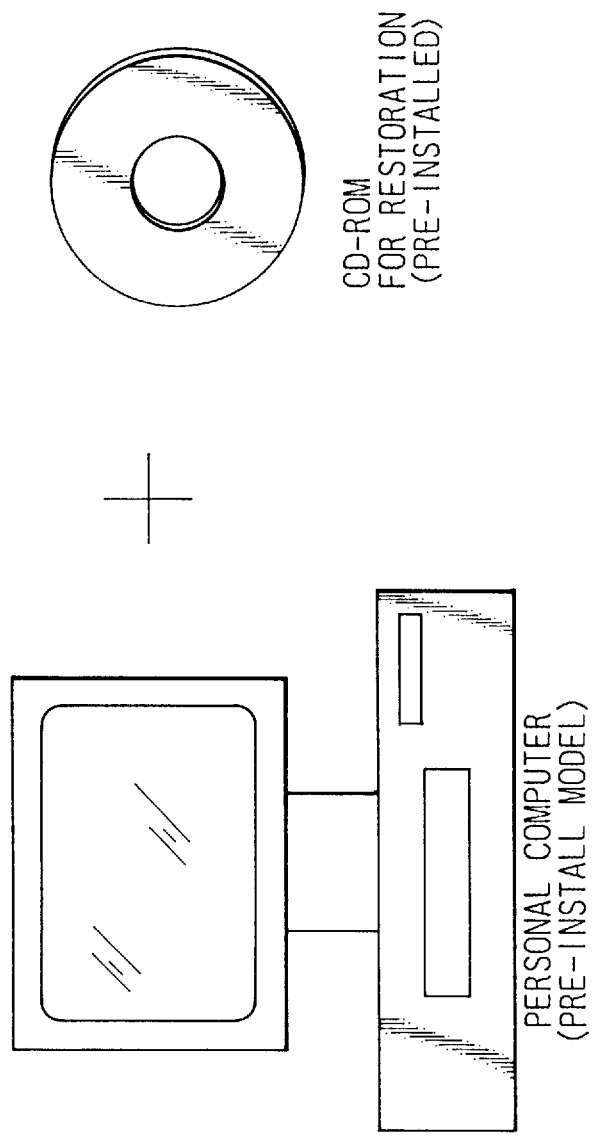

APPARATUS FOR RESTORING/COPYING THE CONTENTS RECORDED IN A STORAGE MEDIUM TO AN AUXILIARY STORAGE INCLUDING PARTITIONS HAVING INDEPENDENT FILE STRUCTURES

BACKGROUND OF THE INVENTION

1. Field of the Invention

The present invention relates to an apparatus for restoring/copying recorded contents. Particularly, it relates to an apparatus for restoring contents recorded in a storage medium to an auxiliary storage, such as a hard disk, and an apparatus for copying contents recorded in the hard disk to the storage medium. The restoring/copying apparatus according to the present invention is provided in, for example, a personal computer.

2. Description of the Related Art

Recently, personal computers have become widely utilized by many users in different information processing fields, and auxiliary storage is widely utilized in personal computers in order to compensate for an insufficient capacity of the main storage of the computer. From this reason, auxiliary storage is called secondary storage or external storage. In general, the representative auxiliary storage is a hard disk (or a magnetic disk).

In general, as mentioned above, a personal computer includes at least one hard disk. Recently, operating systems (OSs) and application programs have been installed on the hard disk before it is forwarded to a shop. This type of personal computer is called a "pre-installed model" and, recently, it has become easily available.

When a user intends to utilize the personal computer having a pre-installed model, he can easily and immediately handle it even if his knowledge concerning the computer is limited. This is because he may be released from the complicated installing work to install the operating system and the application programs.

Although the user can easily handle the personal computer as explained above, there can be many accidental troubles mostly caused by careless mistakes by the user, for example, destruction of contents recorded in the hard disk, when he uses the personal computer.

Accordingly, it is desired for user to easily and quickly take countermeasures against such accidental troubles, for example, the destruction of recorded contents. On the other hand, in order to restore the original contents from a storage medium, such as a CD-ROM, to the hard disk, it is necessary to provide an improved restoring/copying apparatus adapted to auxiliary storage.

FIG. 9, shows one example of the file control unit in a conventional art. In FIG. 9, a hard disk 401 is connected to the file control unit 410 through a disk drive unit 403, and a hard disk 402 is connected to the file control unit 410 through a disk drive unit 404. The hard disks 401 and 402 are auxiliary storage devices.

In the file control unit 410, a block access unit 411-1 controls access operations for each block of the hard disk 401 through the disk drive unit 403 in accordance with an access by a file access unit 412-1. A block access unit 411-2 controls access operations for each block of the hard disk 402 through the disk drive unit 404 in accordance with an access by a file access unit 412-2.

Further, a sector write unit 413 provided in the file control unit 410 controls write operations which are performed in a CD-ROM writer 405 for every sector in accordance with instructions from a file write unit 414. Further, a sector read unit 415 controls read operation which is performed in a CD-ROM reader 406 for every sector in accordance with instructions from a file read unit 416. The CD-ROM is the storage medium for recording a copy of the hard disk.

Still further, the file control unit 410 includes a file transfer unit 417. The file transfer unit 417 controls the transfer and the reception of data to be restored/copied between the hard disks 401 and 402 and the CD-ROM through the file access units 412-1, 412-2, the file write unit 414, and the file read unit 416, in accordance with instructions from a command processing unit 418 which receives commands from a user or an application program.

In the above mentioned file control unit 410, the file transfer unit 417, the file access units 412-1, 412-2, the file write unit 414, and the file read unit 416 are operated by the operating system (OS). Further, the block access units 411-1, 411-2, the sector write unit 413, and the sector read unit 415 are operated by a BIOS (Basic Input/Output System) or a Device Driver. The BIOS has been known in persons skilled in the art, and it indicates a program which executes a basic process necessary for an input/output interface. On the other hand, the Device Driver indicates a software for managing peripheral devices in MS-DOS.

Still further, the block transfer unit 419 controls access operation for every block of the hard disks 401 and 402 through the block access units 411-1 and 411-2, in accordance with the commands input by the user. Further, the block transfer unit 419 reads all the contents recorded in any one of designated hard disk or any one of designated blocks in the hard disk, and transfers them to another hard disk to be copied in order to copy the contents between the hard disks 401 and 402.

In the block transfer between hard disks as mentioned above, the block transfer unit 419 can utilize the same conditions between hard disks, for example, a size of block, a recording method of data. The function is provided by a utility program for maintenance which is useful for preparation of a program, for example, an editor, a loader, etc.

In a conventional art, when the contents of the hard disk are accidentally destroyed, first, the user brings the hard disk to a service station, a service engineer sequentially copies the contents of all blocks in a hard disk, which is previously prepared in the service station, into the hard disk in order to restore the destroyed contents.

On the other hand, it is possible to install again the operating system and the application program from a floppy disk which is previously attached in the personal computer.

In this case, the user utilizes a copy command which is provide in the operating system and copies the application program stored in the floppy disk to the hard disk for each file. As a result, it is possible to reconstruct the contents recorded in the destroyed hard disk.

In this case, since the copy command provided by the operating system can be used for only a file which is managed by the operating system operated by that copy command itself, for example, it is impossible to copy a file operated by OS/2 by using the MS-DOS because the operating system is different. Further, it is necessary to re-construct a hierarchical structure of directories when each file is copied.

There are, however, several other problems in the above-explained conventional art.

First, as explained above, when the user brings the hard disk to the service station, it is not necessary for the user to have detailed knowledge concerning a file system since the service engineer can easily perform restoration of the hard disk. However, it is very troublesome for the user to bring the hard disk itself to the service station.

Second, on the other hand, as mentioned above, when the user reconstructs the contents in the hard disk from the floppy disk which records the software, it is not necessary for the user to bring the destroyed hard disk to the service station. However, in this case, it is necessary for the user to have detailed knowledge concerning the file system and restoration of the hard disk.

Third, if the user has a back-up hard disk which records the contents recorded in shipping stage sent from a factory, he can restore the destroyed contents himself in his home by utilizing the utility software. However, in this case, it is necessary to provide an additional hard disk for the back-up of the destroyed contents. As a result, a cost of a personal computer may be increased by such additional hard disk.

SUMMARY OF THE INVENTION

The object of the present invention is to provide an apparatus for restoring the contents recorded in a storage medium to an auxiliary storage, and an apparatus for copying contents recorded in the an auxiliary storage apparatus to the storage medium, enabling easy and quick restoration/copy of the contents regardless of the kinds of the auxiliary storage.

In accordance with the present invention, there is provided an apparatus for restoring contents recorded in a storage medium to an auxiliary storage, including:

a first auxiliary storage including at least one partition each having an independent file structure, and one particular partition recording partition data concerning the storage position of data in the at least one partition;

a second auxiliary storage including one partition data file corresponding to the particular partition in the first auxiliary storage for holding the partition data, and at least one partition file corresponding to the at least one partition in the first auxiliary storage for holding contents of the at least one partition;

a partition data restoring unit operatively connected to the first auxiliary storage and the second auxiliary storage for reading the partition data file from the second auxiliary storage and recording the partition data into the particular partition in the first auxiliary storage in response to an input command for restoration from the second auxiliary storage to the first auxiliary storage; and a partition restoring unit operatively connected to the first auxiliary storage and the second auxiliary storage for receiving the partition data from the partition data restoring unit, reading sequentially the at least one partition file from the second auxiliary storage in accordance with the input command, and recording the contents of the at least one partition file into a corresponding storage position in the at least one partition in the first auxiliary storage.

In a preferred embodiment, the apparatus further comprises:

a third auxiliary storage having the same data recording format as the first auxiliary storage and recording the partition data to be restored in the first auxiliary storage and contents of the at least one partition;

a fourth auxiliary storage having the same data recording format as the first auxiliary storage and having storage capacity equal to or exceeding the contents to be restored into the first auxiliary storage;

a partition data file preparing unit operatively connected to the third auxiliary storage and the fourth auxiliary storage for reading the partition data in the third auxiliary storage, preparing a partition data file including the partition data, and storing the partition data file into the fourth auxiliary storage; and a partition file preparing unit operatively connected to the third auxiliary storage and the fourth auxiliary storage for reading the contents of the at least one partition in the third auxiliary storage based on the partition data read by the partition data file preparing unit, preparing at least one partition file including the contents of the at least one partition, and storing the partition file into the fourth auxiliary storage; and a first file transferring unit operatively connected to the second auxiliary storage and the fourth auxiliary storage for transferring the partition data file and the at least one partition file, both stored in the fourth auxiliary storage, to the second auxiliary storage.

In another preferred embodiment, the apparatus further comprises:

a compression unit operatively connected to the second auxiliary storage and the fourth auxiliary storage for compressing the contents of the partition data file and the at least one partition file, both stored in the second auxiliary storage, based on a predetermined compression method;

a first expanding unit provided in the partition data restoring unit for expanding the partition data file compressed by the compression unit and stored in the second auxiliary storage, based on a predetermined expanding method;

a second expanding unit provided in the partition restoring unit for expanding the at least one partition file compressed by the compression unit and stored in the second auxiliary storage, based on the predetermined expanding method; and a second file transfer unit operatively connected to the compression unit and the second auxiliary storage for transferring the partition data file and the at least one partition file, both compressed by the compression unit, to the second auxiliary unit.

In still another preferred embodiment, the second auxiliary storage comprises a CD-ROM.

In still another preferred embodiment, a record restoring apparatus comprising:

a first storage for storing one or more partitions recording a plurality of files;

a second storage including a partition data file for holding data to be recorded in a particular position in the first storage, and a plurality of partition file corresponding to the partitions in the first storage and recording the plurality of files;

a partition data restoring unit for reading the partition data file from the second storage and recording contents of the partition data file to the particular position in the first storage; and a partition restoring unit for receiving the partition data stored in the partition data file, reading contents of the partition file from the second storage, and recording the contents into corresponding partition in the first storage.

In still another preferred embodiment, a record copy apparatus comprising:

a storage medium including at least one partition each having independent file structure, and one particular partition recording partition data concerning storage position of data in the at least one partition;

an auxiliary storage for copying contents stored in the storage medium;

a first storage unit for reading the partition data from the storage medium, preparing a partition data file, and storing the partition data file into the auxiliary storage; and a second storage for reading contents of the partition stored in the storage medium as a copy source, preparing a file including all data for each the partition, and storing the file into the auxiliary storage.

BRIEF DESCRIPTION OF THE DRAWINGS

In the drawing:

FIG. 10 is a view for explaining restoration from a CD-ROM to a hard disk according to the present invention;

FIG. 11 is a view for explaining copy from the hard disk to the CD-ROM according to the present invention; and FIG. 12 is a view for explaining sales configuration according to the present invention.

DESCRIPTION OF THE PREFERRED EMBODIMENTS

Figure 6:
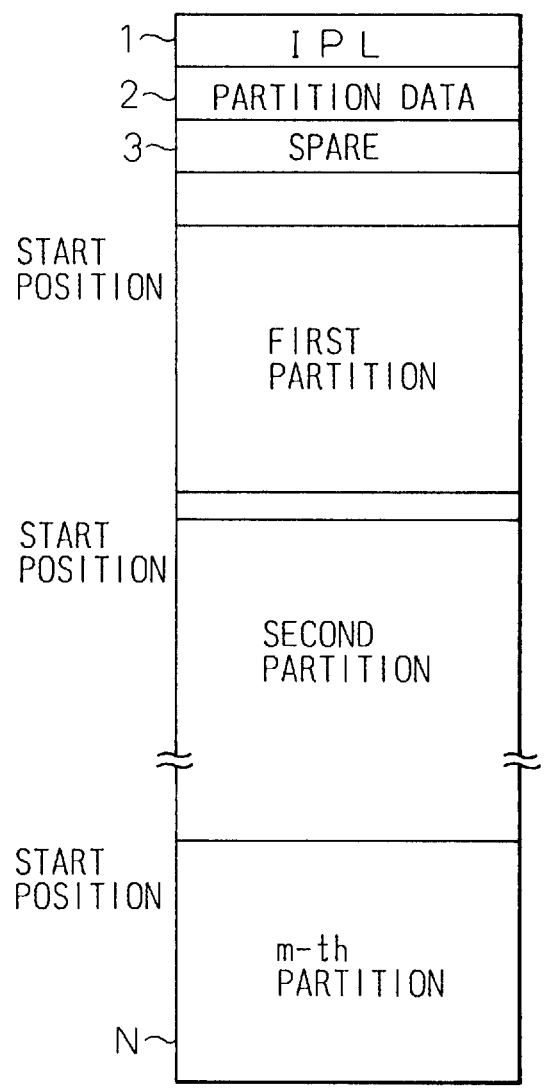
FIG. 6 shows one example of a storage form recorded in a hard disk.

FIG. 6 shows one example of a storage form recorded in the hard disk. As shown in the drawing, a storage area in the hard disk is formed by a plurality of blocks 1 to N. The first block 1 stores an initial program load (IPL), the second block 2 stores partition data, and the third block 3 is used as a spare block which stores device data concerning each hard disk, for example, the number of maximum logical blocks and the block length thereof.

The plurality of blocks 1 to N further includes a plurality of partitions 1 to m. Each of partitions 1 to m is separately accessed as independent storage in accordance with the partition data stored in the second block 2. As shown in the drawing, each of partitions 1 to m has a start position.

Accordingly, in order to restore the contents recorded in the storage medium, for example, a CD-ROM, to the hard disk apparatus, it is necessary to restore the contents and the storage position recorded in each of partitions 1 to m, and to restore the initial program load IPL recorded in the first block 1 and the partition data stored in the third block 3.

Figure 7:
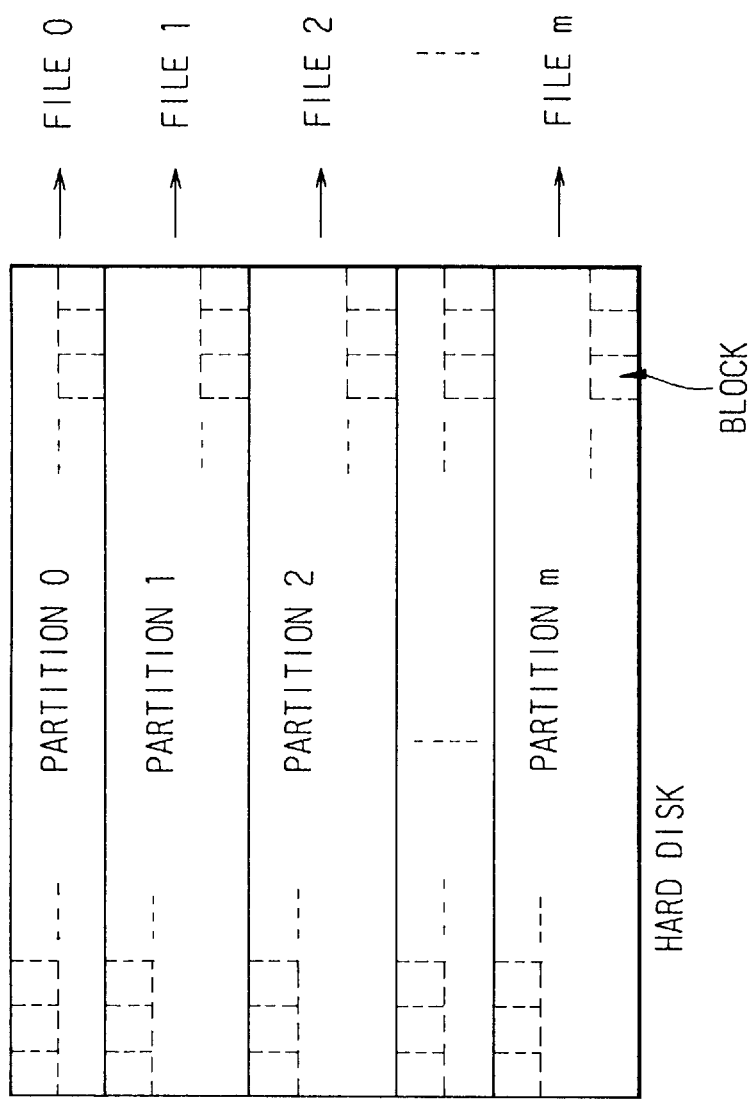
FIG. 7 is a detailed structure of partitions shown in FIG. 6.

FIG. 7 is a detailed structure of partitions shown in FIG. 6. In FIG. 7, the partition 0 corresponds to the block 2 of FIG. 6, and the partitions 1 to m corresponds to the first partition to the m-th partition. Each of the partition 0 and the partitions 1 to m is formed by a plurality of minimum storage areas (below, storage units) as shown by dotted squares.

When copying the contents of the hard disk to the CD-ROM, each partition is copied to each file in the CD-ROM. That is, each file in the CD-ROM is copied from corresponding partition. Accordingly, a file 0 is copied from the partition 0, a file 1 is copied from the partition 1, a file 2 is copied from the partition 2, and a file m is copied from the partition m. As a result, all files are copied from the hard disk to the CD-ROM.

Figure 8:
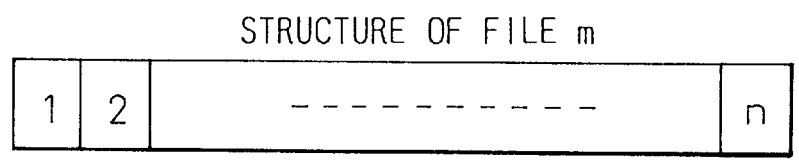
FIG. 8 is a detailed structure of one file in a CD-ROM.

FIG. 8 is a detailed structure of one file in the CD-ROM. As shown in the drawing, the file m is formed by a plurality of storage units 1 to n which correspond to the storage units 1 to n in FIG. 7. That is, each storage unit of FIG. 8 corresponds to each storage unit of FIG. 7.

The present invention aims to provide an apparatus for restoring/copying recorded contents enabling easy and quick restoration/copy of the recorded contents regardless of the kinds of the hard disk.

Figure 1:
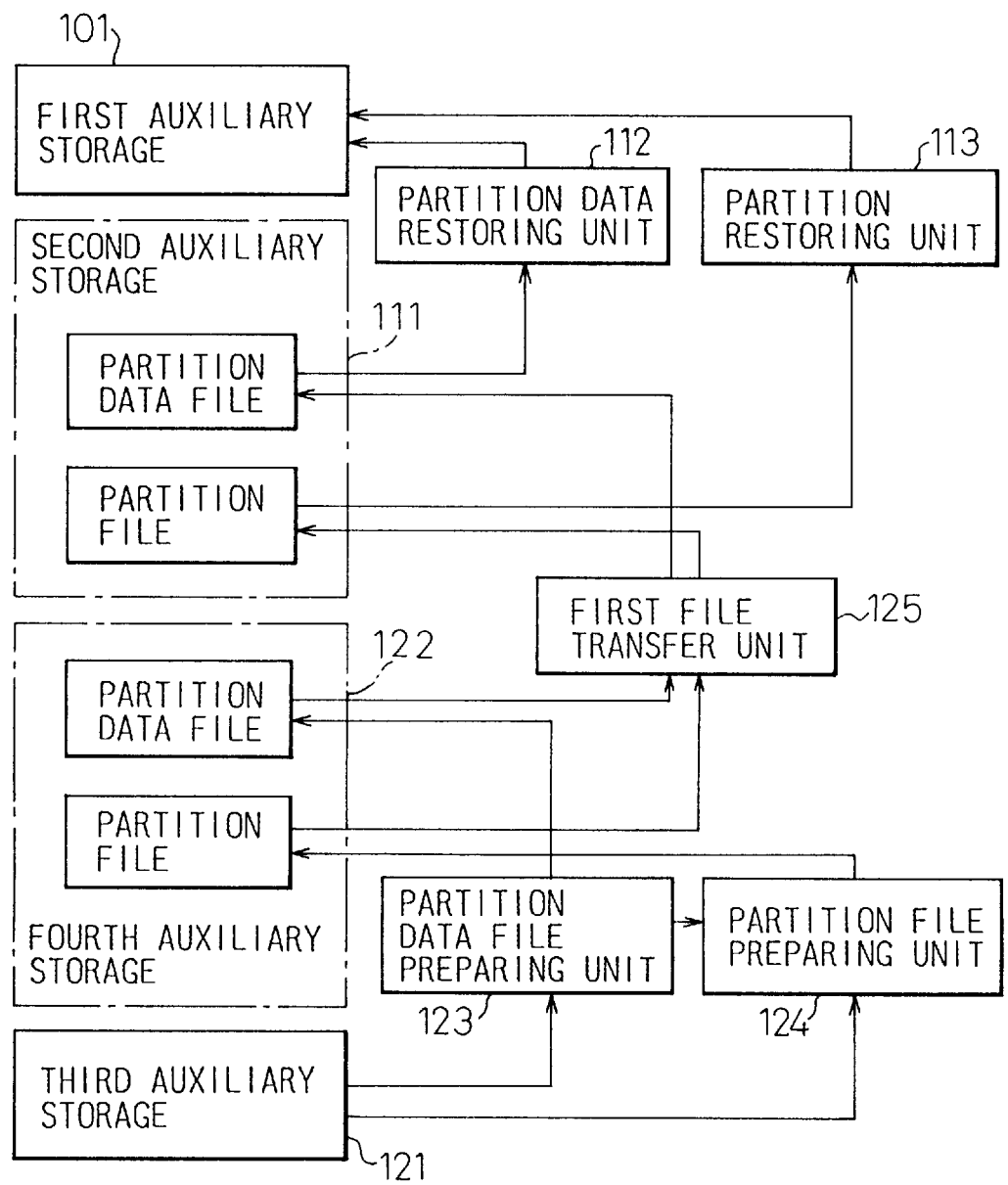
FIG. 1 is a first basic structure of an apparatus for restoring/copying recorded contents according to the present invention.

FIG. 1 is a first basic structure of an apparatus for restoring/copying recorded contents according to the present invention. In FIG. 1, a first auxiliary storage 101 includes at least one partition each having independent file structure. One particular partition records partition data concerning storage position of data in the at least one partition.

A second auxiliary storage 111 includes one partition data file corresponding to the particular partition in the first auxiliary storage for holding the partition data, and at least one partition file corresponding to the at least one partition in the first auxiliary storage for holding contents of the at least one partition.

A partition data restoring unit 112 is operatively connected to the first auxiliary storage and the second auxiliary storage for reading the partition data file from the second auxiliary storage and recording the partition data into the particular partition in the first auxiliary storage in response to an input command for restoration from the second auxiliary storage to the first auxiliary storage.

A partition restoring unit 113 is operatively connected to the first auxiliary storage and the second auxiliary storage for receiving the partition data from the partition data restoring unit, reading sequentially the at least one partition file from the second auxiliary storage in accordance with the input command, and recording the contents of the at least one partition file into corresponding storage position in the at least one partition in the first auxiliary storage.

Further, a third auxiliary storage 121 includes the same data recording format as the first auxiliary storage and contains the partition data to be restored in the first auxiliary storage and contents of the at least one partition.

A fourth auxiliary storage 122 has the same data recording format as the first auxiliary storage and has storage capacity equal to or exceeding contents to be restored into the first auxiliary storage.

A partition data file preparing unit 123 is operatively connected to the third auxiliary storage and the fourth auxiliary storage for reading the partition data in the third auxiliary storage, preparing a partition data file including the partition data, and storing the partition data file into the fourth auxiliary storage.

A partition file preparing unit 124 is operatively connected to the third auxiliary storage and the fourth auxiliary storage for reading contents of the at least one partition in the third auxiliary storage based on the partition data read by the partition data file preparing unit, preparing at least one partition file including contents of the at one partition, and storing the partition file into the fourth auxiliary storage.

A first file transferring unit 125 is operatively connected to the second auxiliary storage and the fourth auxiliary storage for transferring the partition data file and the at least one partition file, both stored in the fourth auxiliary storage, to the second auxiliary storage.

Figure 2:
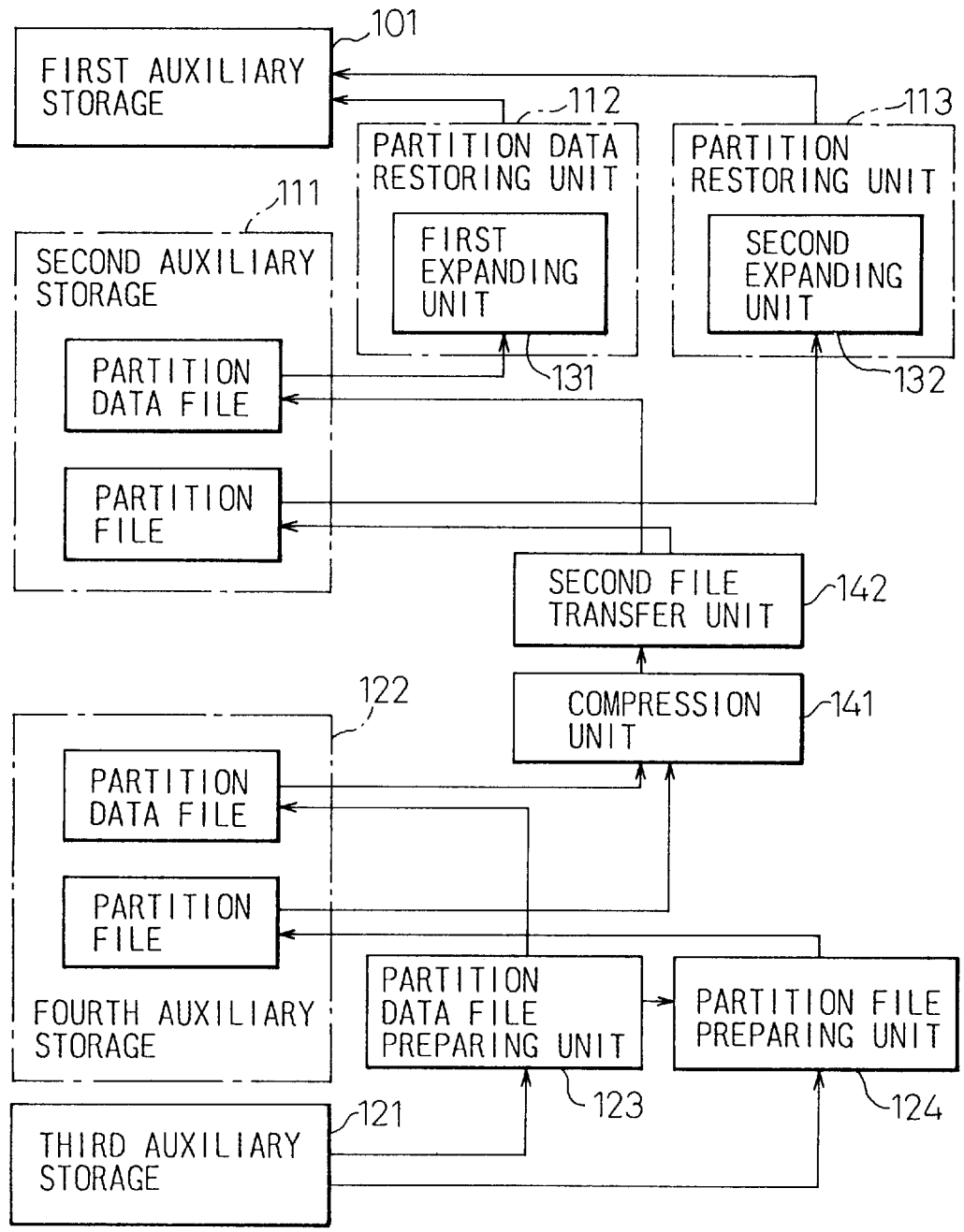
FIG. 2 is a second basic structure of an apparatus for restoring/copying recorded contents according to the present invention.

FIG. 2 is a second basic structure of an apparatus for restoring/copying recorded contents according to the present invention. As shown in the drawing, basically, the structure is the same as shown in FIG. 1. Additional structures are as follows.

A compression unit 141 is operatively connected to the second auxiliary storage and the fourth auxiliary storage for compressing contents of the partition data file and the at least one partition file, both stored in the second auxiliary storage, based on a predetermined compression method.

A first expanding unit 131 is provided in the partition data restoring unit 112 for expanding the partition data file compressed by the compression unit and stored in the second auxiliary storage, based on a predetermined expanding method.

A second expanding unit 132 is provided in the partition restoring unit 113 for expanding the at least one partition file compressed by the compression unit and stored in the second auxiliary storage, based on the predetermined expanding method.

A second file transfer unit 142 is operatively connected to the compression unit and the second auxiliary storage for transferring the partition data file and the at least one partition file, both compressed by the compression unit, to the second auxiliary unit.

Figure 3A:
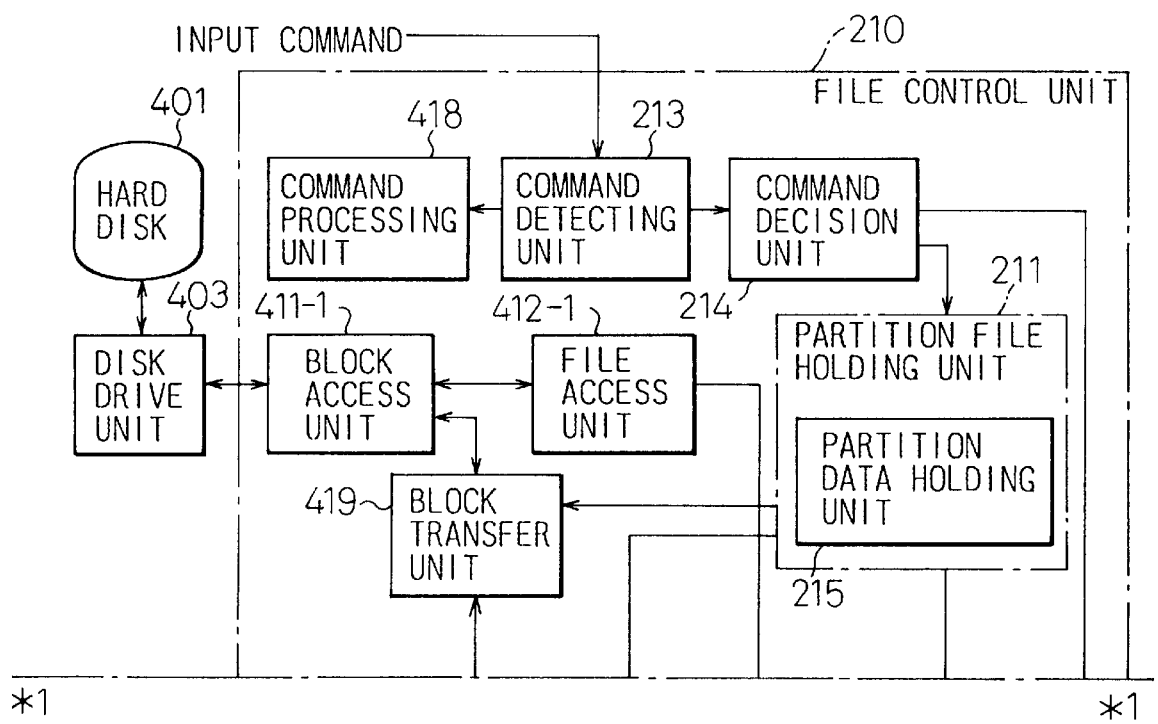
FIGS. 3A and 3B are detailed block diagrams of an apparatus for restoring/copying recorded contents according to an embodiment of the present invention.
Figure 3B:
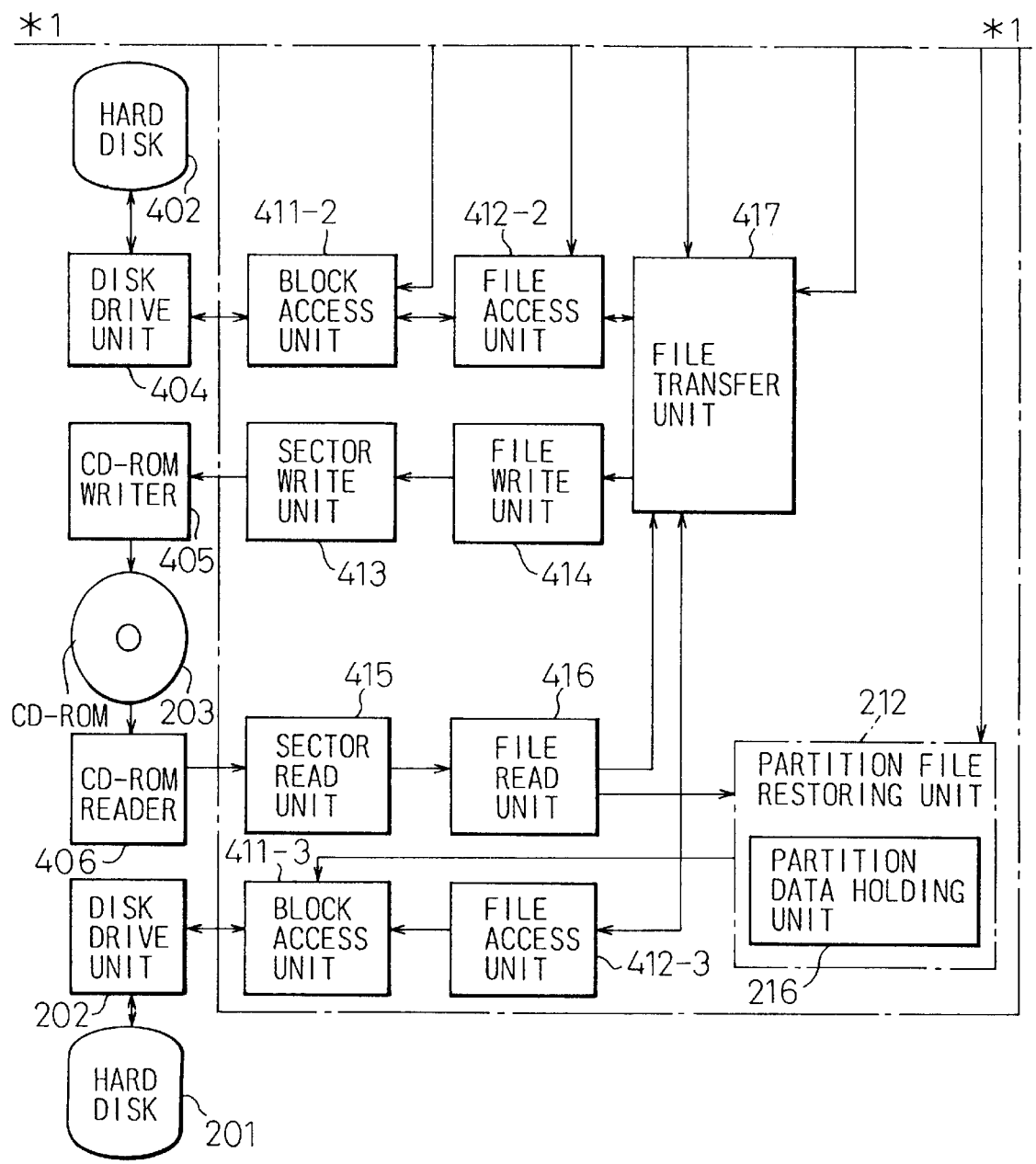
Figure 9:
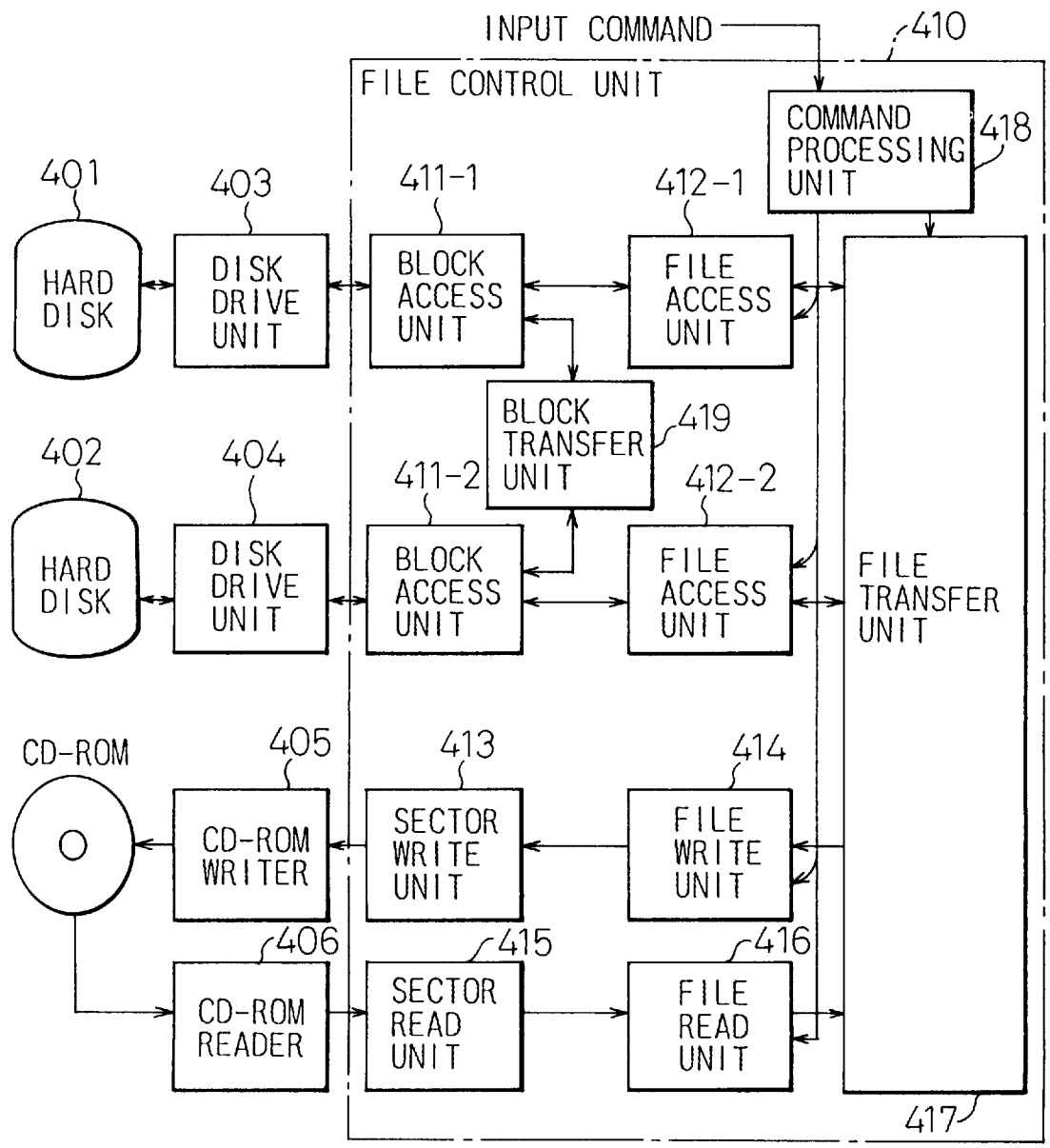
FIG. 9 shows one example of a file control unit in a conventional art.

FIGS. 3A and 3B are detailed block diagrams of an apparatus for restoring/copying recorded contents according to an embodiment of the present invention. In FIGS. 3A and 3B, a file control unit 210 further includes a partition file holding unit 211, a partition file restoring unit 212, a command detecting unit 213, and a command decision unit 214 in addition to the structure of FIG. 9.

Further, the hard disk 401 corresponds to the third auxiliary storage 121 shown in FIGS. 1 and 2, and a predetermined software has already been installed therein. The hard disk 402 corresponds to the fourth auxiliary storage 122 shown in FIGS. 1 and 2, and has sufficient capacity to record all the contents recorded in the hard disk 401.

On the other hand, the hard disk 201 corresponds to the first auxiliary storage 101 shown in FIGS. 1 and 2, and has the same capacity as the hard disk 401. Further, the hard disk 201 is connected to the file control apparatus 210 through the disk drive unit 202 as well as the hard disks 401 and 402. All contents recorded in the hard disk 201 has been initialized. Further, a CD-ROM 203 corresponds to the second auxiliary storage 111 shown in FIGS. 1 and 2, and the all contents recorded therein have been initialized in an initial stage.

In the file control apparatus 210 shown in FIGS. 3A and 3B, the command detecting unit 213 receives instructions (commands) which are input by the user, and detects a copy command contained therein. The detected copy command is sent to the command decision unit 214. Further, the command detecting unit 213 sends other commands except for the copy command to the command processing unit 418. The command processing unit 418 processes these commands so as to be used as the normal file control except for restoration or copy.

The command decision unit 214 starts either the partition file holding unit 211 or the partition file restoring unit 212 in accordance with the kind of auxiliary storage which is designated as a copy source (i.e., a hard disk storing contents to be copied) based on the copy command which is received from the command detecting unit 213.

When the hard disk 401 is designated as the copy source, the command decision unit 214 judges as the holding process of the recorded contents is designated by the user, and starts the partition file holding unit 211. On the other hand, when the CD-ROM 203 is designated as the copy source, the command decision unit 214 judges as the restoration is designated from the CD-ROM to the hard disk, and starts the partition file restoring unit 212.

The partition file holding unit 211 and the partition file restoring unit 212 are used for controlling each of the units provided in the file control unit 410, and for dividing the contents recorded in the hard disk 401 into a plurality of partition files in order to record them into the CD-ROM 203. Further, the partition file holding unit 211 and the partition file restoring unit 212 re-produce the recorded contents concerning to the hard disk 401 from the partition files recorded in the CD-ROM 203, and restores the contents to the hard disk 201.

Figure 4A:
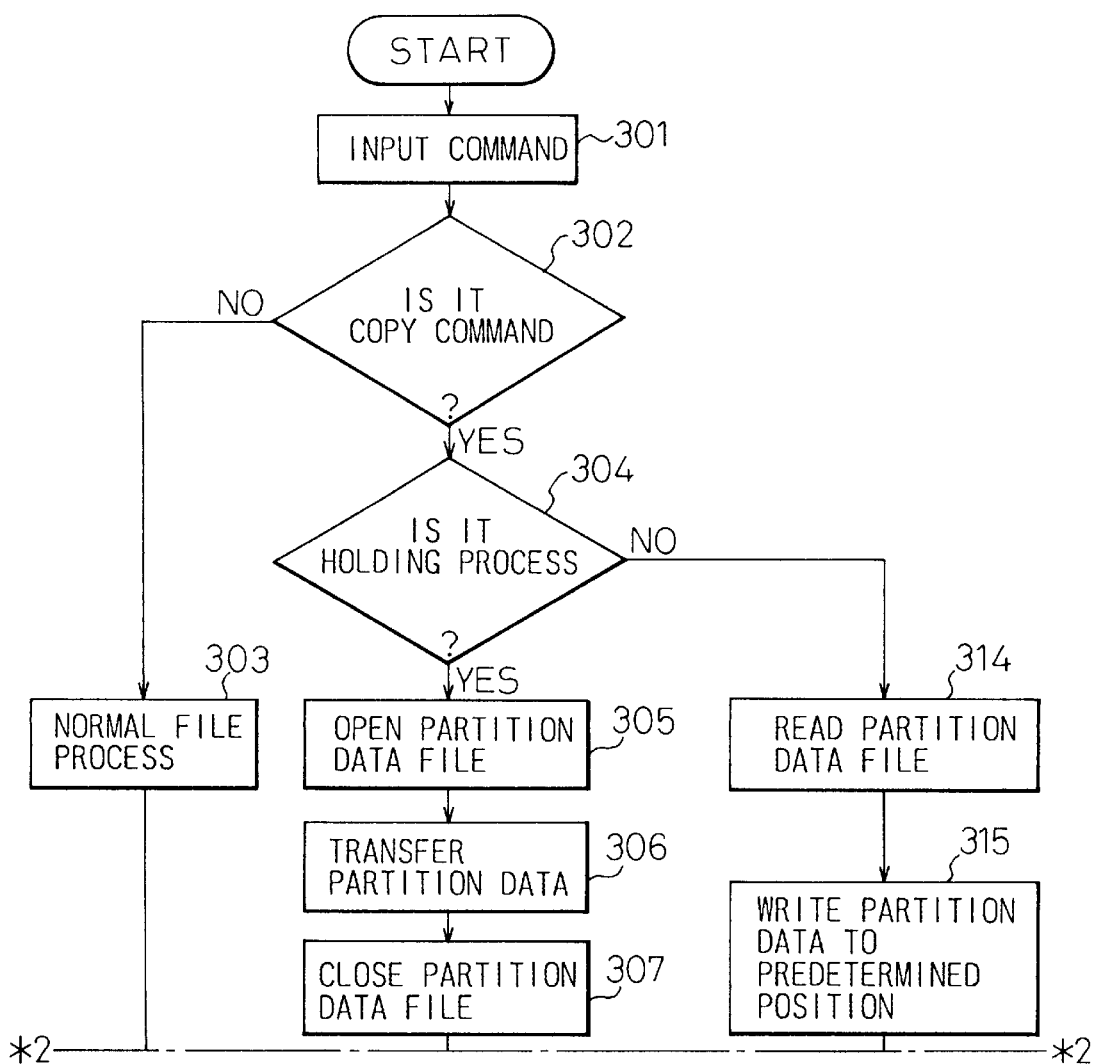
FIGS. 4A and 4B are process flowcharts in a file control unit shown in FIG. 3.
Figure 4B:
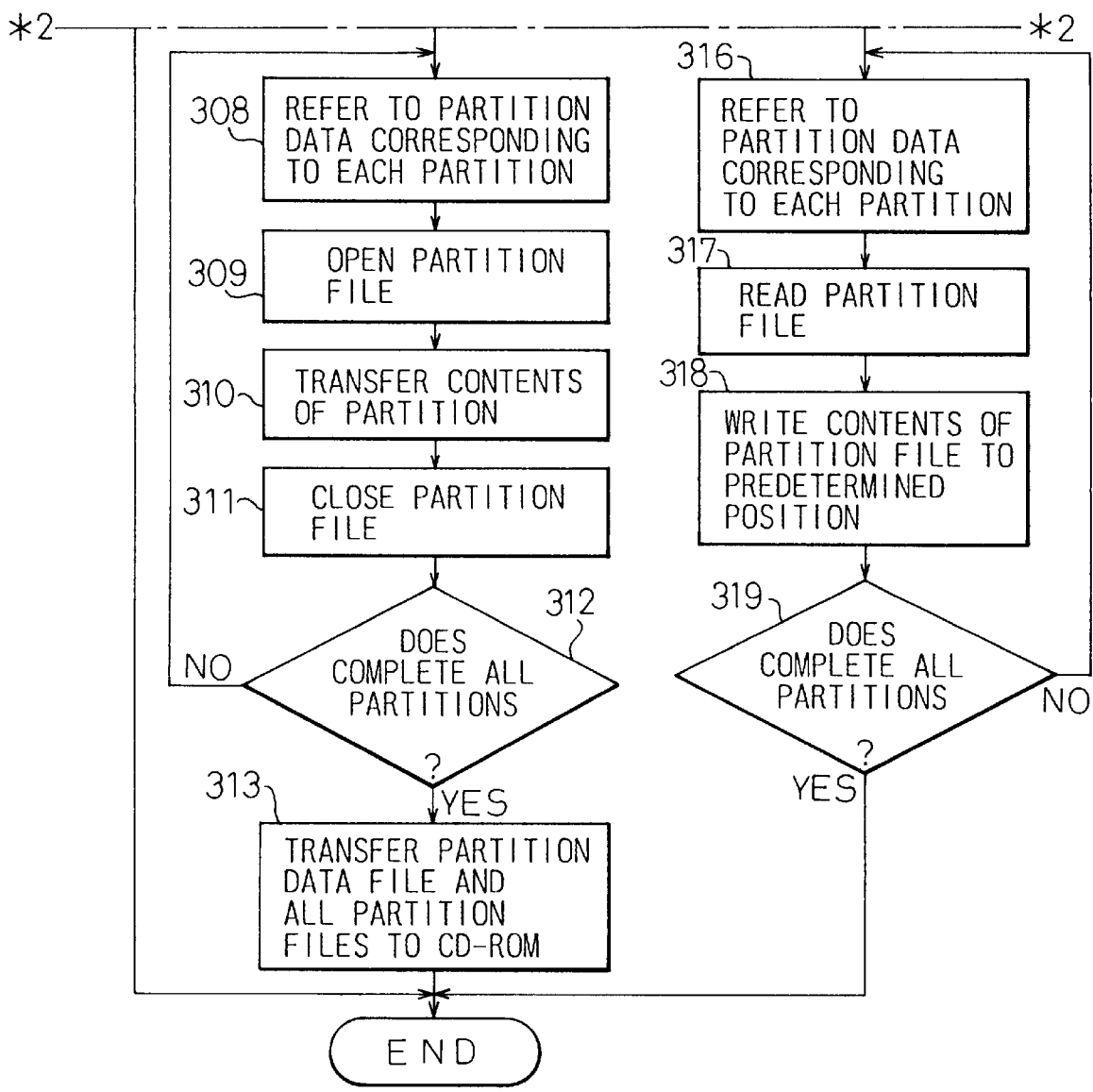

FIGS. 4A and 4B are process flowcharts in the file control unit shown in FIGS. 3A and 3B, and FIGS. 5A and 5B are detailed block diagrams of an apparatus for restoring/copying recorded contents according to another embodiment of the present invention.

Figure 5A:
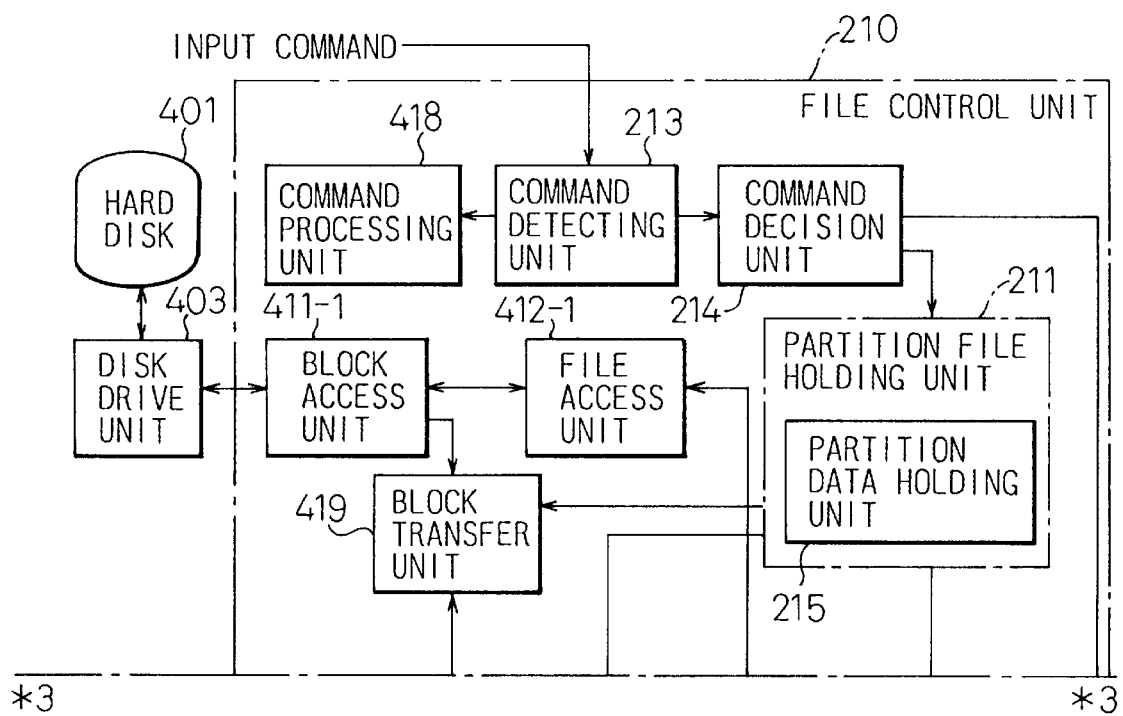
FIGS. 5A and 5B are detailed block diagrams of an apparatus for restoring/copying recorded contents according to another embodiment of the present invention.
Figure 5B:
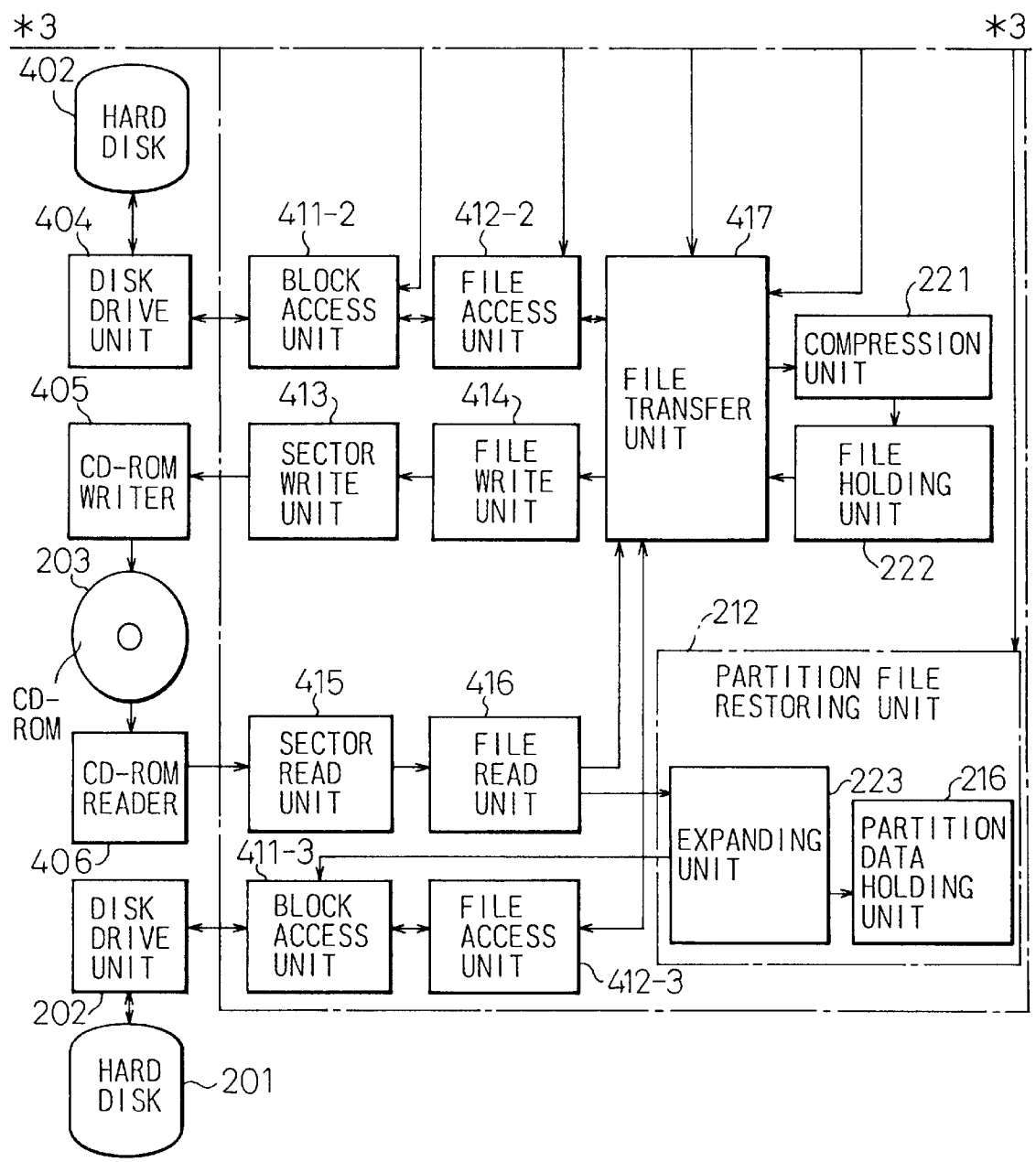

As shown in FIGS. 5A and 5B, a compression unit 221 and a file holding unit 222 are additionally provided in the file control unit 210. Further, an expanding unit 212 is additionally provided in the partition file restoring unit 212.

The processes shown in FIGS. 4A and 4B will be explained in detail with reference to FIGS. 5A and 5B below.

In step 301, the commands for the file control are input to the command detecting unit 213 by the user or through the application program.

In step 302, the command detecting unit 213 determines whether the commands include the copy command.

In step 303, when the commands do not include the copy command, the commands are input to the command processing unit 418 through the command detecting unit 213. The command processing unit 418 controls the file access units 412-1 and 412-2, the file write units 414, the file read unit 416, and the file transfer unit 417 in accordance with normal file processes except for restoration or copy.

In step 304, when the commands include the copy command, the command decision unit 214 determines whether the holding process is instructed based on a kind of the auxiliary storage designated by the copy command.

When the hard disk 401 is designated as the auxiliary storage of the copy source, the step 304 becomes the holding process, and the partition file holding unit 211 starts operation in accordance with the result of the decision in the command decision unit 214.

In step 305, the partition file holding unit 211 opens, for example, partition data files of three blocks through the file access unit 412-2 which corresponds to the hard disk 402.

In step 306, the partition file holding unit 211 transfers the data, which are recorded in the area (for example, areas from the first block to the third block) which includes the partition data of the hard disk 401, through the block transfer unit 419.

In step 307, after above processes, the partition holding unit 211 closes the partition data file through the file access unit 412-2.

As explained above, the partition file holding unit 211 controls the operation of the file access unit 412-2 and the block transfer unit 419 so that it is possible to realize the preparing function in the partition data file preparing unit 123.

At that time, the partition file holding unit 211 receives the partition data recorded in the hard disk 401. from the block transfer unit 419, and holds the data in the partition data holding unit 215 which is provided in the partition file holding unit 211. After the above processes, based on the partition data, the contents recorded in each partition in the hard disk 401 are held in the hard disk 402.

Since the above-mentioned partition data includes data concerning the start position of each partition and the number of blocks, the partition file holding unit 211 can recognize the size of the file necessary for holding the contents recorded in each partition.

In step 308, first, the partition file holding unit 211 refers to the partition data holding unit 215, and obtains the start position Pi and the number of blocks $n_i$ of the i-th partition.

In step 309, next, the partition file holding unit 211 opens the partition file having the capacity corresponding to the number of blocks $n_i$ into the hard disk 402 through the file access unit 412-2.

In step 310, the partition file holding unit 211 informs the start position Pi and the number of blocks $n_i$ in the i-th partition to the block transfer unit 419 and starts the transfer process thereto, and the partition file holding unit 211 sequentially transfers the contents of all the blocks, which are contained in the partitions in the hard disk 401, to the partition file in the hard disk 402 which has been opened in step 309.

In step 311, after the above process, the partition file holding unit 211 closes the partition file through the file access unit 412-2. As explained above, since the partition file holding unit 211 controls the operation of the block access unit 411-1 and 411-2 through the file access unit 412-2 and the block transfer unit 419, it is possible to realize the function of the partition file preparing unit 124, and to copy the contents of all blocks contained in the i-th partition in the hard disk 401 into each partition file in the hard disk 402.

In this case, the i-th partition file is opened/closed as the file of the current operating system (for example, MS-DOS). The data recorded in the i-th partition file are transferred by utilizing the functions of the block access units 411-1 and 411-2 which are provided by the BIOS or the Device Driver. Accordingly, regardless of whether the i-th partition in the hard disk 401 is the partition which is managed by the current operating system, it is possible to copy the contents of the partition to the corresponding partition file. That is, in the hard disk 401, when the copy command is executed during operation of MS-DOS, the partition file, which corresponds to the partition consisting of the file operated by OS/2, is held as the file of MS-DOS.

In step 312, the partition file holding unit 21 detects whether partition files corresponding to all partitions from the first partition to the m-th partition are prepared, and the process returns to the step 308 in accordance with the result of the detection. After the above steps, the partition file preparing processes are repeated for the next partition so that it is possible to hold the contents of all partitions in the hard disk 401 in the partition file in the hard disk 402.

Further, the partition file holding unit 211 controls the operations in the hard disks 401 and 402 through the block transfer unit 418 and the block access unit 411 so that it is possible to realize the copying apparatus according to the present invention and to completely copy the contents recorded in the hard disk 401 onto hard disk 402.

In step 313, when preparation of the partition files corresponding to all partitions in the hard disk 401 is completed (YES, in step 312), the partition file holding unit 211 sequentially copies the contents of the partition data file and all partition files in the hard disk 402 into the CD-ROM 203.

Each of the partition data file and the partition file can be managed by utilizing the file system provided by the operating system which is currently active. That is, the file transfer unit 417 controls the operations of the block access unit 411-2 and the disk drive unit 404 in response to the instructions sent from the partition file holding unit 211 in accordance with normal file transfer sequences through the file access unit 412-2. Further, the file transfer unit 417 controls the operations of the sector write unit 413 and the CD-ROM writer 405 through the file write unit 414 so that it is possible to realize the function of the first file transfer unit 125, and it is possible to copy the contents of the partition data file and the partition file in the hard disk 402 into the CD-ROM 203.

On the other hand, when the CD-ROM 203 is designated as the copy source of the copy command which is input in the step 301, the step 304 becomes NO, and the partition file restoring unit 212 starts the operation thereof.

In step 314, the partition file restoring unit 212 controls the operation of the sector read unit 415 and the CD-ROM reader 407 through the file read unit 416, and reads the partition data file recorded in the CD-ROM 203. Further, the partition file restoring unit 212 holds the partition data concerning the hard disk 401, which are included in the partition data file, into the partition data holding unit 216 provided in the partition file restoring unit 212 itself.

In step 315, next, the partition file restoring unit 212 directly sends the contents of the partition data file to the block access unit 411-3 corresponding to the hard disk 201, controls the operation of the disk drive unit 202 through the block access unit 411-3, and sequentially writes the contents of the partition data file from the third block to the first block in the hard disk 201.

Accordingly, it is possible to restore the recorded contents from the first block to the third block in the hard disk 201, and from the first block to the third block in the hard disk 401. That is, the partition file restoring unit 212 executes the control processes described in steps 314 and 315, and it is possible to realize the function of the partition data restoring unit 212.

As mentioned above, after restoration of the partition data in the hard disk 201, the partition file restoring unit 212 in the hard disk 201 sequentially restores each of partitions based on the partition data held in the partition data holding unit 216.

In step 316, the partition file restoring unit 212 obtains the block number Pi and the number of blocks ni indicating the start position of the i-th partition with reference to the partition data holding unit 216.

In step 317, the partition file restoring unit 212 reads the partition file corresponding to the i-th partition from the CD-ROM 203 through the file read unit 416, sends the contents to the block access unit 411-3, and designates the start position Pi which indicates the write start position.

In step 318, after step 317, the partition file restoring unit 212 writes the contents of the partition file to the hard disk 201.

Accordingly, it is possible to restore the contents of the i-th partition in the hard disk 401 into the storage area which consists of ni blocks which are started from the Pi-th block of the hard disk 201. That is, the partition file restoring unit 212 executes each control process in steps 316 and 318 so that it is possible to realize the preparing function in the partition restoring unit 113.

In step 319, the partition file restoring unit 212 determines whether all partitions from the first to the m-th partition are restored. When it is NO, the process returns to step 316.

When restoring processes for all partitions held in the CD-ROM 203 are completed (i.e., when it is YES in step 319), the partition file restoring unit 212 determines that all partitions in the hard disk 201 are restored and the restoring processes are completed.

In this case, for example, the contents in the partition data file correspond to the recorded contents from the first block to the third block, and indicate the complete copy including data in the hard disk 401. Since the hard disk 401 and the hard disk 201 are the same kind of auxiliary storage which can be accessed in accordance with the same predetermined method, the contents of the partition data file are sent to the block access unit 211-3 so that it is possible to directly write the contents into the storage area in the hard disk 201.

That is, since the present invention has a structure which prepares the partition data file and the partition file through the same auxiliary storage as the auxiliary storage to be restored (i.e., hard disk), it is possible to handle the contents of the partition data file and the partition file as the data adapted to the auxiliary storage to be restored, regardless of the kind of the storage medium which holds the partition data file and the partition file.

Accordingly, it is possible to utilize functions which are provided by the present software resource, such as the file read unit 416 and the block access unit 411-3, the former reads the files recorded in the CD-ROM 203, and the latter writes the data into the block in the hard disk 201, so that it is possible to realize the functions of the partition data restoring unit 112 and the partition restoring unit 113.

Further, when the CD-ROM is utilized as the storage medium for the partition data file and the partition file, it has many advantages since the contents of the CD-ROM are unerasable, and CD-ROM itself is portable as explained below.

FIG. 10 is a basic view for explaining restoration from the CD-ROM to the hard disk according to the present invention, and FIG. 11 is a view for explaining copy from the hard disk to the CD-ROM according to the present invention. Since the restoration/copy processes in the present invention are explained above, the detailed explanations will be omitted in these drawings.

FIG. 12 is a view for explaining a sales configuration according to the present invention. In FIG. 12, the personal computer has the pre-install model. That is, for example, "MS-Windows", "MS-DOS", etc., are already installed in the hard disk in the personal computer. The CD-ROM is attached to the personal computer when selling it. In this case, the contents of the hard disk are held in the CD-ROM. When the hard disk is accidentally destroyed, the CD-ROM is used for restoring the destroyed contents.

As shown in FIG. 11, in the personal computer of a pre-installed model, the partition data file 0 and the partition files 1 to m in the hard disk are copied in the CD-ROM (for example, CD-ROM 203). Further, the copied CD-ROM (below, CD-ROM 208) is mass-produced, and each CD-ROM is attached to the personal computer when selling it.

In this case, after the personal computer is sold, when the hard disk in the personal computer is accidentally destroyed, the user starts an operating system, and inputs the copy command for the CD-ROM 208 to the file control unit as the copy source.

In accordance with this copy command, the partition file restoring unit 212 starts operation, and executes above restoration. Accordingly, it is possible to restore the contents of the hard disk to the shipped state of the personal computer in accordance with the partition data file and the partition file recorded in the CD-ROM 208.

As mentioned above, since the CD-ROM is unerasable, the data recorded in the CD-ROM 208 is not erased in a normal state. Accordingly, the CD-ROM is very useful for holding back-up data. Further, the CD-ROM has several hundred mega-bytes as the storage capacity so that it has sufficient capacity to hold the contents of the hard disk in the personal computer.

According to the present invention, since the CD-ROM 208 is attached to the personal computer when it is sold, the user can easily restore the hard disk whenever he needs to do so. Further, it is possible to deliver the CD-ROM 208 in accordance with the requirement from the user.

Further, data compression/expansion which is utilized in the present invention will be explained in detail with reference to FIGS. 5A and 5B. That is, when recording the partition data file and the partition file to the CD-ROM 203, the contents are compressed as explained below. On the other hand, when restoring the files from the CD-ROM to the hard disk, the compressed contents are expanded.

For example, in FIGS. 5A and 5B, a compression unit 221 and a file holding unit 222 are additionally provided in the file control unit 210. The partition file holding unit 211 transfers the partition data file and the partition file, which are held in the hard disk 402, to the CD-ROM 203 through the compression unit 221 and the file holding unit 222.

In this case, the partition file holding unit 211 sequentially reads the partition data file and m partition files through the file access unit 412-2, and sends the files to the compression unit 221. For each result of the compression corresponding to each file, each result of the compression is temporarily recorded in the file holding unit 222, and the contents of the file holding unit 222 are written into the CD-ROM 203 using the function of the file transfer unit 417.

As explained above, it is possible to realize functions of the compression unit 141 and the second file transfer unit 142, to compress the partition data file and m partition files corresponding to those of hard disk 401, and to record them into the CD-ROM 203.

In this embodiment, known compression methods, for example, run-length, LZ (Ziv-Lempel), and Huffman, are utilized as compression methods in the compression unit 221.

In FIGS. 5A and 5B, the partition file restoring unit 212 comprises an expanding unit 223 for expanding the data compressed by the compression unit 221.

In this case, the partition file restoring unit 212 reads the compressed partition data file through the file read unit 416, and inputs the data into the expanding unit 223 in order to reproduce the partition data. The obtained partition data are sent to the block access unit 411-3, and held in the partition data holding 216 in order to restore the contents of the m partitions.

Next, the partition file restoring unit 212 sequentially reads the compressed m partition files through the file read unit 416, inputs the contents into the expanding unit 223, and sends the recorded contents of each partition which are reproduced.

As explained above, the compressed partition data file and m partition files are expanded by the expanding unit 223 so that it is possible to realize the functions of the first expanding unit 131 and the second expanding unit 132 and to reproduce the recorded contents of the original partition data and m partitions.

When compressing the partition data file and the partition file recorded in the CD-ROM 203, it is possible to hold the data concerning all the recorded contents into one CD-ROM 203 and to restore them even if the storage capacity of the hard disk 401 is larger than that of CD-ROM 203.

Accordingly, it is possible to apply the present invention to a back-up system of the auxiliary storage which has capacity considerably exceeding a normal hard disk.

Further, although the storage capacity of a mini-disk (MD) is smaller than that of the CD-ROM, it is possible to compress the contents of the hard disk so as to adapt to the capacity of the mini-disk so that it is possible to restore the contents of the CD-ROM. If the capacity of the hard disk 401 is smaller than that of the mini-disk, the mini-disk can be utilized as the storage medium.

When the mini-disk is used as the storage medium, it is necessary to provide a driver for the mini-disk in the personal computer. On the other hand, since the mini-disk is erasable, the contents thereof can be accidentally destroyed. However, since the mini-disk is also erasable, the user can record the contents of the hard disk after he bought so that it is possible to utilize the min-disk as the back-up system.

I claim:

1. An apparatus for restoring the contents recorded in a storage medium to an auxiliary storage, comprising:

a first auxiliary storage comprising at least one partition having an independent file structure, and one particular partition recording partition data concerning storage position of data in said at least one partition;

a second auxiliary storage comprising one partition data file corresponding to said particular partition in said first auxiliary storage for holding said partition data, and at least one partition file corresponding to said at least one partition in said first auxiliary storage for holding contents of said at least one partition;

a partition data restoring unit, operatively connected to said first auxiliary storage and said second auxiliary storage, reading said partition data file from said second auxiliary storage and recording said partition data into said particular partition in said first auxiliary storage in response to an input command for restoration from said second auxiliary storage to said first auxiliary storage;

a partition file restoring unit, operatively connected to said first auxiliary storage and said second auxiliary storage, receiving said partition data from said partition data restoring unit, sequentially reading said at least one partition file from said second auxiliary storage in accordance with said input command, and recording the contents of said at least one partition file into corresponding storage position in said at least one partition in said first auxiliary storage;

a third auxiliary storage recording having the same data format as said first auxiliary storage and recording said partition data to be restored in said first auxiliary storage and contents of said at least one partition;

a fourth auxiliary storage having the same data recording format as said first auxiliary storage and having storage capacity equal to or exceeding contents to be restored into said first auxiliary storage;

a partition data file preparing unit, operatively connected to said third auxiliary storage and said fourth auxiliary storage, reading said partition data in said third auxiliary storage, preparing a partition data file including said partition data, and storing said partition data file into said fourth auxiliary storage;

a partition file preparing unit, operatively connected to said third auxiliary storage and said fourth auxiliary storage, reading the contents of said at least one partition in said third auxiliary storage based on said partition data read by said partition data file preparing unit preparing at least one partition file including the contents of said at least one partition, and storing said partition file into said fourth auxiliary storage;

a first file transferring unit, operatively connected to said second auxiliary storage and said fourth auxiliary storage, transferring said partition data file and said at least one partition file, both stored in said fourth auxiliary storage, to said second auxiliary storage;

a compression device, operatively connected to said second auxiliary storage and said fourth auxiliary storage, compressing the contents of said partition data file and said at least one partition file, both stored in said second auxiliary storage, based on a predetermined compression method, a first expanding device provided in said partition data restoring unit expanding said partition data file compressed by said compression means and stored in said second auxiliary storage, based on a predetermined expanding method;

a second expanding device provided in said partition restoring unit expanding said at least one partition file compressed by said compression device and stored in said second auxiliary storage, based on the predetermined expanding method; and a second file transfer unit, operatively connected to said compression device and said second auxiliary storage, transferring said partition data file and said at least one partition file, both compressed by said compression device, to said second auxiliary storage.

2. An apparatus as claimed in claim 1, wherein said second auxiliary storage comprises a CD-ROM.

* * * * *

UNITED STATES PATENT AND TRADEMARK OFFICE
CERTIFICATE OF CORRECTION

PATENT NO. : 5,829,045

DATED : October 27, 1998

INVENTOR(S) : Minoru Motoyama

It is certified that error appears in the above-identified patent and that said Letters Patent is hereby corrected as shown below:

On the title page, item [73] Assignee: should read –FUJITSU LIMITED Kawasaki-shi, Kanagawa, Japan--

Signed and Sealed this

Fourteenth Day of September, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.:   5,829,045
DATED     :   October 27, 1998
INVENTOR(S):  Minoru MOTOYAMA It is certified that error appears in the above-identified patent and that said Letters Patent is hereby corrected as shown below:

On the title page, [73], change "Tokyo" to --Kawasaki--;
   [56], OTHER PUBLICATIONS, line 3, change "Dec. 13, 1994" to --Oct. 13, 1994--;

Col. 5,    line 23, change "drawing" to --drawings--.

Col. 11,   line 61, change "copy" to --copying--.

Col. 13,   line 43, change "min" to --mini--.

Signed and Sealed this

Eighteenth Day of January, 2000

Attest:

Q. TODD DICKINSON

Attesting Officer        Commissioner of Patents and Trademarks

UNITED STATES PATENT AND TRADEMARK OFFICE
CERTIFICATE OF CORRECTION

PATENT NO.   : 5,829,045
DATED        : October 27, 1998
INVENTOR(S)  : Minoru Motoyama It is certified that error appears in the above-identified patent and that said Letters Patent is hereby corrected as shown below:

Title page,
Item [73], change "Tokyo" to -- Kawasaki --;
Item [56], OTHER PUBLICATIONS, change "Dec. 13, 1994" to -- Oct. 13, 1994 --;
Change "3-7804(A)" to -- 3-78042(A) --; and change "2-250265(A)" to
-- 2-250165(A) --.

Column 5,
Line 23, change "drawing" to -- drawings --.

Column 11,
Line 61, change "copy" to -- copying --.

Column 13,
Line 43, change "min" to -- mini --.

Signed and Sealed this

Fourth Day of February, 2003

JAMES E. ROGAN
*Director of the United States Patent and Trademark Office*